United States Patent

[11] 3,602,944

[72] Inventors Gyorgy Szabo;
Sandor Toth, both of Gyor, Hungary
[21] Appl. No. 6,422
[22] Filed Jan. 28, 1970
[45] Patented Sept. 7, 1971
[73] Assignee Licencia Talalmanyokat Ertekesito Vallalat
Budapest, Hungary
[32] Priority Jan. 30, 1969
[33] Hungary
[31] SA-1928

[54] APPARATUS FOR THE MANUFACTURE OF SYNTHETIC LEATHER
1 Claim, 1 Drawing Fig.
[52] U.S. Cl. .................................................. 18/13 R,
18/4 B, 18/6 E, 18/15 S, 264/284
[51] Int. Cl. ........................................................ B29c 15/00,
B29d 7/14, B29c 17/00
[50] Field of Search........................................... 18/4 B, 4 S,
1 FE, 5 A, 6 E, 10, 15 R, 15 S, 15 V, 13 R, 13 RR,
13 S; 264/284, 310, 316

[56] References Cited
UNITED STATES PATENTS

| 1,300,250 | 4/1919 | Crowell | 18/15 S X |
| 1,807,223 | 5/1931 | Miller | 18/15 S X |
| 2,221,019 | 11/1940 | Clarke | 18/15 S X |
| 3,178,768 | 4/1965 | Edberg | 18/4 B |
| 3,369,503 | 2/1968 | Murphy | 18/4 B X |

*Primary Examiner*—J. Spencer Overholser
*Assistant Examiner*—R. L. Spicer, Jr.
*Attorney*—Michael S. Striker

ABSTRACT: An apparatus for the manufacture of synthetic leather by forming a superficial film layer from the surface of a fiber layer comprising thermoplastic fibers or from a thermoplastic powder or granulate applied onto a carrier or fiber layer. The apparatus comprises a feed and tensioning unit, a support roller, a heating roller, an endless metal strip guided between the support roller and heating roller, a guiding roller for guiding and tensioning the metal strip, means for cooling the melt, means for cooling the metal strip and the product, and a discharge roller for removing the product.

PATENTED SEP 7 1971
3,602,944
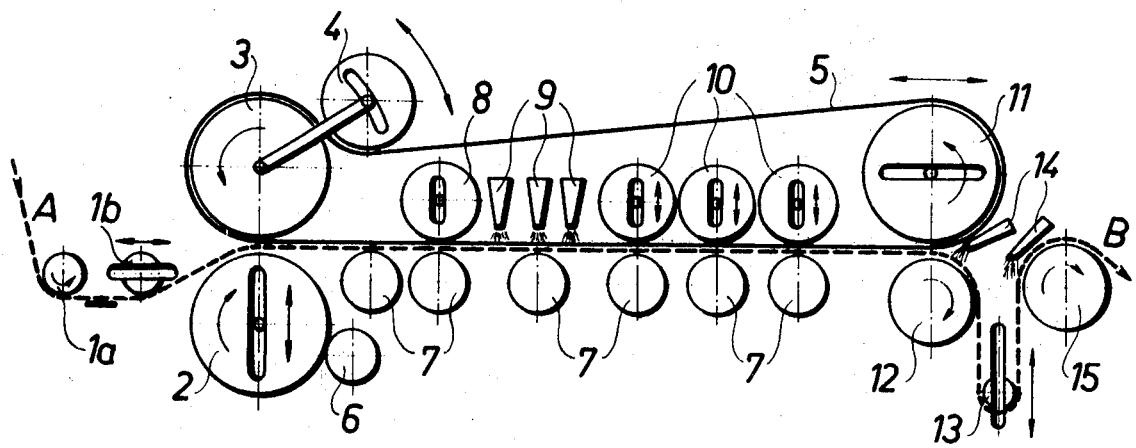
INVENTOR
GYORGY SZABO
SANDOR TOTH
BY
ATTORNEY

APPARATUS FOR THE MANUFACTURE OF SYNTHETIC LEATHER

The invention relates to an apparatus for the manufacture of synthetic leather.

From the aspect of the processes hitherto employed for this purpose, the known apparatuses for the manufacture of synthetic leather can be divided into three main categories.

a. In the earliest conventional apparatus the synthetics or film forming agents dissolved in dispersing or emulsifying media are applied in several coats directly on the carrier, the dispersing or emulsifying medium is evaporated, the coats or layers gelled and cooled, and the product is wound up.

b. In a more recently used apparatus the synthetics or film forming agents, dissolved in a dispersing medium or emulsifier, are applied in several coats on a "release" paper, treated with a separating substance, then the layers are united with the carrier, gelled, cooled, and the products wound up.

c. A variant of the machine under (b), with the difference, however, of employing a thin steel strip instead of the "release" paper strip.

These conventional apparatuses have the common drawback of involving the use of evaporation of inflammable solvents; their gelation requires a heat treatment to be carried out within a very narrow temperature range, they are voluminous and extremely costly.

It is the object of the invention to provide a simple and inexpensive apparatus of low floor space requirement, which permits the manufacture of synthetic leathers by means of novel technologies differing from the conventional technologies.

The invention is based on the recognition that on the surface of a fiber layer comprising among others thermoplastic fibers, or from a thermoplastic powder or granulate applied onto a carrier or fiber layer, it is possible to form a porous or microporous surface film layer of appropriate softness, free of adhesion, by heat treating with the aid of a metal strip.

The invention therefore relates to an apparatus for producing a superficial film layer from the surface of a fiber layer comprising among others thermoplastic fibers, or from a thermoplastic powder or granulate applied onto a carrier or fiber layer, comprising a feed and tensioning unit 1, a support roller 2, a heating roller 3, an endless metal strip 5 guided between the support roller and heating roller, a guiding roller 11 for guiding and tensioning the metal strip, means 7 for cooling the melt and, if desired, for guiding and supporting the carrier provided with the superficial film layer, means 8, 9, 10 for cooling the metal strip and the product, resp., and a discharge roller 12 for removing the product.

The apparatus according to the invention is equally suitable for forming a superficial film layer from the material of a fiber layer both with or without a carrier, as well as from a thermoplastic synthetic material applied on a carrier or onto the surface of a fiber layer.

The invention is more particularly described below with reference to the accompanying drawing showing a preferable embodiment of the apparatus according to the invention.

The operation of the apparatus is as follows:

The fabric A which serves as carrier, is led from the feed roller 1a to the tensioning roller 1b, hence to the support roller 2, where the thermoplastic synthetic material or fiber layer disposed on that side of the carrier which faces the heating roller 3 is caused to melt on the effect of heat transmitted from the heating roller 3 with the aid of the steel strip 5.

The melt of synthetic material thus formed on the carrier is cooled, together with the steel strip 5, with the aid of the means 8, 9 and 10. The supporting roller 2 is cooled by the cooling roller 6. The carrier provided with the film layer is guided and supported by the rollers 7. It is advisable to cool said roller 7 by means of fluid circulation in order to accelerate thereby the cooling of the article. The required tension of the steel strip 5 is adjusted by means of the tensioning roller 4 and the strip guiding roller 11.

The carrier provided with a film layer is conveyed from the discharge roller 12 to the swinging roller 13, which is adjustable to respond to the desired loading, then, after passing to the cooled controlling roller 15, to a winding means not shown in the drawing. The product thereafter conveyed to the discharge roller 12 is cooled by means of the cooling nozzles 14. The swinging roller 13 also controls the monitor device not shown in the drawing.

The following Example serves to more particularly illustrate the operation of the apparatus according to the invention.

EXAMPLE

The fabric used as carrier has a width of 80 cm., a density of warp of 240 per 10 cm. and a number of picks of 370 per 10 cm., wherein a set of warp consisting of Nm 60/2 cotton yarn is used, the weft consisting of Nm 50/2 polyamide–6. The fabric is a five-yarn fabric in sateen, with a shoot of weft counted by twos. The carrier is finished to duvetine (moleskin) and a cotton runner of identical width and 10 meter length is stitched to it. The runner is inserted at the path designated in the drawing in broken line between A and B, and is wound onto a storage cylinder not represented in the drawing.

As support roller 2 a cotton cylinder of 600 mm. diameter is employed which has been adjusted in relation to the endless steel strip 5 to have an edge pressure producing a surface pressure of 200 g./cm.$^2$ surface on the carrier to be treated. The electrically heated roller 3 is heated to 218 ±1° C., with the machine running at basic speed. With the aid of the cotton runner the carrier is introduced into the machine in such a manner as to cause the fiber layer on its surface to bear on the heated steel strip. The machine is adjusted to operating speed (appr. 10 m./sec.), and the gap between the steel strip and the supporting rollers 7 is set to 0.8 mm. by adjusting the cooling rollers 8 and 10. Thereafter the pumps for the cooling fluid of the rollers 8, 10 and 15 as well as the fans of the nozzles 9 and 14 are set working. By full or partial operation of the nozzles 9 and the cooling rollers 8 and 10 the cooling of the strip is so adjusted as to ensure that the strip is not cooled below 40° C. less than the operating temperature.

The article provided with a molten surface film is separated from the steel strip with the aid of the roller 12, this latter being situated so as to produce a clearance of 20 mm. between its surface and the steel strip.

After separation or removal from the steel strip, the intense cooling of the product is performed by the nozzles 14 and the fluid-cooled roller 15.

What we claim is:

1. An apparatus for the manufacture of synthetic leather by forming a superficial film layer from the surface of a fiber layer comprising among other thermoplastic fibers, or from a thermoplastic powder or granulate applied onto a carrier or fiber layer, comprising a feed and tensioning unit (1a,1b), a support roller (2), a heating roller (3), an endless metal strip (5) guided between the support roller and heating roller, a guiding roller (11) for guiding and tensioning the metal strip, means (7) for cooling the melt and, if desired, for guiding and supporting the carrier provided with the superficial film layer, means (8, 9, 10) for cooling the metal strip and the product, and a discharge roller (12) for removing the product.